United States Patent [19]

Miyawaki

[11] Patent Number: 4,705,346

[45] Date of Patent: Nov. 10, 1987

[54] THIN FILM TYPE OPTICAL DEVICE

[75] Inventor: Mamoru Miyawaki, Tokyo, Japan

[73] Assignee: Canon Kabushiki Kaisha, Tokyo, Japan

[21] Appl. No.: 733,368

[22] Filed: May 13, 1985

[30] Foreign Application Priority Data

May 17, 1984 [JP] Japan ................. 59-100298

[51] Int. Cl.⁴ .............................................. G02B 6/12
[52] U.S. Cl. ................. 350/96.14; 350/96.12; 350/96.13
[58] Field of Search .............. 350/96.11, 96.12, 96.13, 350/96.14, 96.34

[56] References Cited

U.S. PATENT DOCUMENTS

| 4,037,005 | 7/1977 | Phillips | 350/96.12 X |
| 4,439,265 | 3/1984 | Alferness et al. | 350/96.12 X |
| 4,440,468 | 4/1984 | Auracher et al. | 350/96.12 |
| 4,547,262 | 10/1985 | Spillman, Jr. et al. | 350/96.12 X |

OTHER PUBLICATIONS

Jackel et al, "Variation in Waveguides Fabricated by Immersion of...", *Appl. Phys. Lett.*, vol. 41, No. 6, Sep. 1982, pp. 508-510.

Jackel et al, "Proton Exchange for High-Index Waveguides in LiNbO₃", *Appl. Phys. Lett.*, vol. 41, No. 7, Oct. 1982, pp. 607-608.

DeMicheli et al, "Independent Control of Index and Profiles in...", *Optics Letters*, vol. 8, No. 2, Feb. 1983, pp. 114-115.

*Primary Examiner*—John Lee
*Attorney, Agent, or Firm*—Fitzpatrick, Cella, Harper & Scinto

[57] ABSTRACT

A thin film type optical device comprises a substrate formed of lithium niobate crystal or lithium tantalate crystal, and a light waveguide path layer comprising protons introduced into the surface of the substrate and having a refractive index higher than that of the substrate. The absorption peak of the infrared absorption spectrum of OH radical by the protons in the light waveguide path layer exists in the range of wave number 3480 cm⁻¹ to 3503 cm⁻¹.

6 Claims, 6 Drawing Figures

THIN FILM TYPE OPTICAL DEVICE

BACKGROUND OF THE INVENTION

1. Field of the Invention

This invention relates to a thin film type optical device, i.e., an optical device having a thin film light waveguide path, and more particularly to a thin film type optical device used as a light deflecting device, a light modulator, a spectrum analyzer, a light correlator or the like utilizing the electro-optical (EO) effect or the acousto-optical (AO) effect.

2. Description of the Prior Art

When forming a thin film type optical device as described above, lithium niobate (hereinafter referred to as $LiNbO_3$) crystal and lithium tantalate (hereinafter referred to as $LiTaO_3$) crystal, both excellent in piezoelectric property, EO effect and AO effect and having a small light propagation loss, have heretofore been widely used as the substrate thereof. As a typical method of making a thin film light waveguide path by the use of such a crystal substrate, there is a method of heat-diffusing titanium (hereinafter referred to as Ti) on the surface of said crystal substrate at a high temperature, thereby forming on the surface of said crystal substrate a light waveguide path layer having a refractive index slightly greater than the refractive index of the substrate. However, the thin film light waveguide path made by this method has suffered from the disadvantage that it is susceptible to optical damage and only light of very small power can be introduced into the waveguide path. The optical damage refers to "a phenomenon that when the intensity of light input to the light waveguide path has been increased, the intensity of the light propagated through the light waveguide path and taken out therefrom is not increased in proportion to the intensity of said input light by scattering."

As a method for making a light waveguide path to overcome said optical damage, there is a method of heat-treating a $LiNbO_3$ or $LiTaO_3$ crystal substrate at a high temperature, externally diffusing lithium oxide (hereinafter referred to as $Li_2O$) from within said crystal substrate and forming near the surface of the substrate a lithium (hereinafter referred to as Li) empty grating layer having a refractive index slightly greater than that of the substrate. It is shown in the literature [R. L. Holman & P. J. Cressman: IOC, 90, 28 April (1981)] that by said $Li_2O$ external diffusing method, the threshold value of optical damage becomes higher than by the Ti internal diffusing method.

Now, when it is desired to realize a light deflecting device or a light modulator by the utilization of the acousto-optical effect or the electro-optical effect, it is important in the formation of the element to enhance the efficiency of each said effect. As a typical example utilizing the acoustooptical effect, there is a method of applying a high frequency electric field to a comb type electrode formed on a light waveguide path by photolithography and exciting an elastic surface wave on the light waveguide path. It is known that in this case, the interaction of the elastic surface wave excited on the light waveguide path and the waveguide light propagated through the light waveguide path increases as the energy distribution of the waveguide light is confined near the surface of the substrate [C. S. Tsai, IEEE TRANSACTIONS ON CIRCUITS AND SYSTEMS, Vol. CAS-26, 12, 1979].

From the viewpoint of utilizing said interaction to its maximum, the thickness of the light waveguide path layer (Li empty grating layer) formed by the aforedescribed $Li_2O$ external diffusing method must be considerably great, say, of the order of 10–100 $\mu$m, because the variation in the refractive index thereof is small. This is not preferable in that the energy distribution of the waveguide light spreads in the direction of thickness. Accordingly, where the thin film type optical device made by the aforedescribed $Li_2O$ external diffusing method is utilized in said light deflecting device or the like, it has been difficult to realize a device of high efficiency.

On the other hand, the ion exchange method is known as another method for making a thin film light waveguide path which overcomes optical damage. According to this method, a $LiNbO_3$ or $LiTaO_3$ crystal substrate is heat-treated at a low tempeature in a molten salt such as thallium nitrate (hereinafter referred to as $TlNO_3$), silver nitrate (hereinafter referred to as $AgNO_3$) or kalium nitrate (hereinafter referred to as $KNO_3$) or in a weak acid such as benzoic acid ($C_6H_5COOH$), whereby the lithium ions ($Li^+$) in the crystal substrate are exchanged with the ion species such as protons ($H^+$) in the weak acid and a light waveguide path layer having a great refractive index difference ($\Delta n - 0.12$) is formed.

The threshold value of optical damage of the thin film light waveguide path made by the above-described ion exchange method has good characteristics improved several tens of times as compared with that of the thin film light waveguide path made by the Ti diffusion. On the other hand, it has suffered from the problem that the piezo-electric property and the electro-optical characteristic inherent to $LiNbO_3$ or $LiTaO_3$ crystal are reduced by said ion exchange process and where it is used, for example, in a light deflecting device, the diffraction efficiency of the waveguide light is reduced.

SUMMARY OF THE INVENTION

It is an object of the present invention to solve the above-noted problems peculiar to the prior art and to provide a thin film type optical device having a sufficiently high threshold value of optical damage and which functions at high efficiency.

The above object of the present invention is achieved by a thin film type optical device comprising a substrate formed of lithium niobate crystal or lithium tantalate crystal, and a light waveguide path layer comprising protons introduced into the surface of the substrate and having a refractive index higher than that of the substrate and wherein the absorption peak of the infrared absorption spectrum of OH radical by the protons in the light waveguide path layer exists in the range of wave number 3480 $cm^{-1}$ to 3503 $cm^{-1}$. That is, the inventor has found as a result of his study that the reduction in the diffraction efficiency in the conventional thin film type optical device is not always caused by the introduction of protons but can be prevented by coupling the protons together in a state different from that in the prior art.

DESCRIPTION OF THE PREFERRED EMBODIMENTS

Some embodiments of the present invention will hereinafter be described by reference to the drawings.

Figure 1:
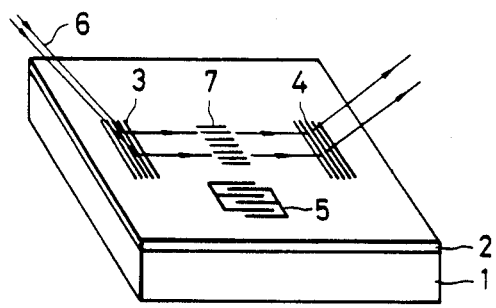
FIG. 1 is a schematic perspective view showing an embodiment in which a thin film type optical device according to the present invention is used in a light deflecting device utilizing the acousto-optical effect.

FIG. 1 is a perspective view showing an embodiment of the thin film type AO device according to the present invention. In FIG. 1, reference numeral 1 designates an x plate or y plate LiNbO$_3$ crystal substrate, reference numeral 2 denotes a light waveguide layer comprising a titanium diffusing and proton exchange layer, reference numerals 3 and 4 designate grating photocouplers, and reference numeral 5 denotes a comb type electrode. An HeNe laser light 6 of wavelength 6328 Å is directed from the grating photocoupler 3 into the light waveguide layer 2 and is diffracted by an elastic surface wave 7 produced by applying an RF power to the comb type electrode 5, and the diffracted light is taken out by the grating photocoupler 4.

Figure 2A:
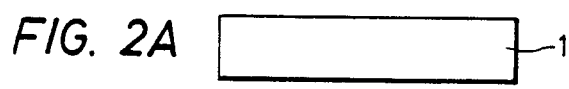
FIGS. 2A-2D are schematic cross-sectional views showing an example of the manufacturing process of the thin film type optical device of the present invention.
Figure 2B:
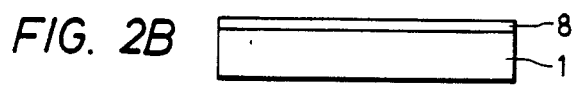

FIGS. 2A-2D illustrate a method of making the thin film type AO device as described above. First, as shown in FIG. 2A, the y surface or x surface of the y plate or x plate LiNbO$_3$ crystal substrate 1 was polished to the flatness within several Newton rings, whereafter it was subjected to the ordinary ultrasonic wave washing by acetone and then pure water, and nitrogen gas was blown thereagainst and said surface was dried. Subsequently, a Ti thin film was evaporated to a thickness of 200 Å on said y surface or x surface by electron beam evaporation, and was heat-diffused in an oxygen atmosphere at 965° C. for 2.5 hours, whereby a Ti heat-diffused layer 8 was formed as shown in FIG. 2B. The heat-diffused metal may be V, Ni, Au, Ag, Co, Nb, Ge or the like.

Figure 2C:
Figure 2D:
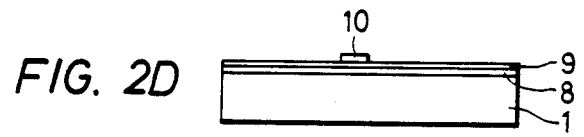

Subsequently, lithium benzoate was added to benzoic acid at a molar ratio of 5% and the mixture was placed into a crucible. A LiNbO$_3$ crystal substrate 1 having the Ti diffused layer 8 of FIG. 2B was placed into the crucible in which the benzoic acid and lithium benzonate were contained, and these were placed into a heat furnace and held at a temperature of 250° C. for 5 hours to thereby effect ion exchange process, with a result that as shown in FIG. 2C, a proton exchange layer 9 was formed in the Ti diffused layer 8. In forming the proton exchange layer, in addition to the mixture of benzoic acid and lithium benzoate, mention may be made of a mixture of a material whose degree of dissociation in carboxylic acid is $10^{-6}$ to $10^{-3}$ and a material in which hydrogen of carboxyl radical of this carboxylic acid is substituted for by lithium, such as a mixture of palmitic acid [CH$_3$(CH$_2$)$_{14}$COOH] and palmitic acid lithium [CH$_3$(CH$_2$)$_{14}$COOLi] or a mixture of stearic acid [CH$_3$(CH$_2$)$_{16}$COOH] and lithium stearate [CH$_3$(CH$_2$)$_{16}$COOLi]. Also, the molar ratio of the materials substituted for by lithium was varied in the range of 1% to 10% and various samples were made. The material was subjected to ultrasonic wave washing by ethanol, and nitrogen gas was blown thereagainst to dry the material. Subsequently, by the use of the conventional photolithography technique, a comb type electrode 10 was formed on said proton exchange layer 9, as shown in FIG. 2D.

An RF power was applied to the comb type electrode of the thus made thin film type AO device and an experiment of diffraction of the waveguide light by an elastic surface wave was carried out. The comb type electrode was of a center frequency 400 MHz, and the frequency of the applied RF power was also 400 MHz. However, the wavelength of the waveguide light was 6328 Å. When the relation between the amount of lithium benzoate added and the maximum diffraction efficiency of the waveguide light obtained in a range in which the RF power does not exceed 1 W was examined, it was found that where the amount of lithium benzoate added is at a molar ratio of 3% or more, said maximum diffraction efficiency is as high as 90% and where the amount of lithium benzoate added is at a molar ratio of less than 3%, said maximum diffraction efficiency is as low as 15% or less. In order to examine the reason why the characteristic of diffraction efficiency varies so sharply with 3% as the boundary, measurement of polarized infrared absorption spectrum was carried out for each sample. The direction of variation of the electric field of the infrared light was so arranged to be orthogonal to the C axis [(001)] of LiNbO$_3$ crystal and LiTaO$_3$ crystal. Paying attention to the absorption peak of OH radical in the vicinity of wave number 3500 cm$^{-1}$, it was found that in a light waveguide path which is good in the deflection characteristic by the elastic surface wave (where the amount of lithium benzoate added is at a molar ratio of 3% or more), the wave number of the absorption peak of said OH radical is in the range of 3480 cm$^{-1}$ to 3503 cm$^{-1}$, whereas in a light waveguide path which is bad in the deflection characteristic by the elastic surface wave (where the amount of lithium benzoate added is at a molar ratio of less than 3%), the wave number of the absorption peak of said OH radical is 3506 cm$^{-1}$. Said difference in wave number is attributable to the difference in the coupled state of protons in LiNbO$_3$ crystal or LiTaO$_3$ crystal.

Accordingly, it is because the coupled state of protons is bad that the conventional thin film type optical device into which protons have been introduced is bad in deflection characteristic, and if, as in the present invention, the absorption peak of the infrared spectrum of OH radical by protons is made to be in the range of wave number 3480 cm$^{-1}$ to 3503 cm$^{-1}$, there can be realized an element which is good in deflection characteristic.

On the other hand, measurement of the threshold value of optical damage was carried out for both of a Ti diffused LiNbO$_3$ light waveguide path and the LiNbO$_3$ light waveguide path of said embodiment in which a proton exchange process has been effected after Ti diffusion. The laser light used in the measurement is a HeNe laser of wavelength 6328 Å. In the case of the Ti diffused LiNbO$_3$ light waveguide path, an optical damage phenomenon occurred when the power of the emergent light shown in FIG. 1 became 0.1 mW/mm or more. However, in the case of the LiNbO$_3$ light waveguide path shown in the present embodiment wherein lithium benzoate was added at a molar ratio of 5% and a Ti diffusion proton exchange process was effected, no optical damage phenomenon occurred up to the emergence light power of 0.5 mW/mm.

That is, in the case of the light waveguide path in which lithium benzoate was added by 3% or more and the proton exchange process was effected, the deflection characteristic of the waveguide light by the elastic surface wave was of the same degree as or greater than that of the Ti diffused $LiNbO_3$ light waveguide path and the threshold value of the optical damage was about five times greater than that of the conventional Ti diffused light waveguide path.

In the above-described embodiment, there has been shown a making method whereby a crystal substrate is proton-exchanged in benzoic acid to which lithium benzoate has been added by 3% or more, whereas the present invention need not always resort to such making method, but any thin film optical element may suffice if the peak of the infrared absorption spectrum satisfies the aforementioned conditions. In order to explain this, another embodiment will be shown below.

A light waveguide path in which a proton exchange process was effected by only benzoic acid and a light waveguide path in which a proton exchange process was effected with lithium benzoate being added in the range of 1% to 10% were placed into a heat furnace, oxygen was flowed thereinto at a flow rate of 1.0 l/min. through heated water, and in this wet oxygen atmosphere containing steam, an annealing treatment was effected at 350° C. for 4 hours and protons were heat-diffused. The crystal substrates used in the above-mentioned proton exchange process were untreated $LiNbO_3$ crystal substrate and $LiTaO_3$ crystal substrate, $LiNbO_3$ crystal substrate and $LiTaO_3$ crystal substrate after subjected to $Li_2O$ external diffusing process, and $LiNbO_3$ crystal substrate after subjected to Ti diffusion.

After the annealing treatment, when measurement of the polarized infrared absorption spectrum was effected in a manner similar to the previous case, it was found that for the light waveguide path in which a proton exchange process was effected with lithium benzoate being added, the wave number of the absorption peak of OH radical in the vicinity of 3500 $cm^{-1}$ is in the range of 3480 $cm^{-1}$ to 3503 $cm^{-1}$ irrespective the kinds of the crystal substrates before subjected to the proton exchange process and the treating method.

Here, as a typical example of these, description will be made of the light deflection characteristic and the optical damage characteristic, by the elastic surface wave, of a light waveguide path obtained by effecting Ti diffusion on an x plate $LiNbO_3$ crystal substrate, effecting a proton exchange process with lithium benzoate being added to benzoic acid by 1% and thereafter effecting said annealing treatment.

A comb type electrode of center frequency 400 MHz was made on this crystal substrate after the annealing treatment by the use of the conventional photolithography technique similarly to the previous case. An RF power of frequency 400 MHz was applied to this comb type electrode 5, and a light of wavelength 6328 Å was waveguided thereto and, when the diffraction efficiency of this waveguide light was examined, it was a sufficiently high value, say, 70%, when the RF power was 600 mW.

Further, measurement of the threshold value of optical damage was effected on both a conventional optical element having a Ti diffused $LiNbO_3$ light waveguide path and the optical element of the present embodiment. The laser light used in the measurement is a He-Ne laser of wavelength 6328 Å. In the case of the conventional optical device, when the power of the emergent light became 0.1 mW/mm or more, optical damage occurred. However, in the case of the optical device of the present invention, no optical damage occurred up to the emergent light power of 1.7 mW/mm. Thus, the light waveguide path of the present embodiment is improved about seventeen times in the threshold value of optical damage as compared with the conventional Ti diffused waveguide path, and the emergent power of the waveguide light which can be taken out has become about thirteen times as compared with the conventional $LiNbO_3$ light waveguide path. Accordingly, it will be seen that the thin film type optical device of the present embodiment is suitable for use in an optically functioning apparatus.

As described above, the amount of lithium benzoate added to benzoic acid during the proton exchange is not related to the high efficiency when the thin film type optical element is used in an optically functioning apparatus, but it is essential for said high efficiency to couple the protons in $LiNbO_3$ crystal and $LiTaO_3$ crystal together so that the wave number of the absorption peak of OH radical by the protons in said crystals exists in the range of 3480 $cm^{-1}$ to 3503 $cm^{-1}$. Accordingly, in the case of a thin film type optical device in which the wave number of the absorption peak of OH radical exists in the range of 3480 $cm^{-1}$ to 3503 $cm^{-1}$, the making method is not restricted to the method as described above whereby proton exchange is effected in benzoic acid containing lithium benzoate nor to the method of effecting an annealing treatment. Also, the crystal substrate forming the light waveguide path layer may be any one such crystal substrate subjected to no other treatment than proton exchange, a crystal substrate in which protons and a metal are introduced or heat-diffused, or a crystal substrate in which protons are introduced or heat-diffused and LiO is externally diffused.

Figure 3:
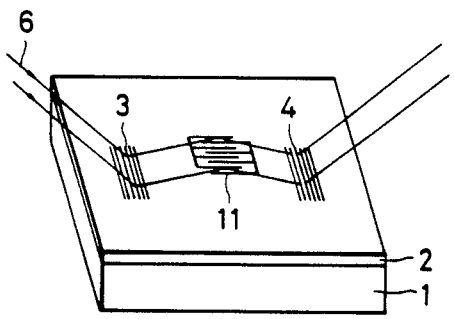
FIG. 3 is a schematic perspective view showing an embodiment in which a thin film type optical device according to the present invention is used in a light deflecting device utilizing the electro-optical effect.

The thin film type optical device of the present invention can also be used in a light deflecting device using the electro-optical effect as shown in FIG. 3. In FIG. 3, portions common to those in FIG. 1 are given identical reference numerals and need not be described in detail. The laser light 6 is directed from the grating photocoupler 3 to the light waveguide path layer 2 formed on the x plate or y plate $LiNbO_3$ crystal substrate 1 by heat diffusion of Ti and protons so that the absorption peak of the infrared absorption spectrum of OH radical by protons is in the range of wave number 3480 $cm^{-1}$ to 3503 $cm^{-1}$. This waveguide light is diffracted by a phase grating produced by applying a voltage to a comb type electrode 11 for the electro-optical (EO) effect, and is taken out from the grating photocoupler 4. The comb type electrode made herein had an electrode width and inter-electrode interval of 2.2 μm, an intersection width of 3.8 mm and a logarithm of 350 pairs. Also, when a voltage of 6 V was applied to said comb type electrode, it was found that diffraction efficiency as high as 90% could be obtained.

In the above-described embodiment, an $LiNbO_3$ crystal substrate is used as the substrate, but alternatively, a lithium tantalate ($LiTaO_3$) crystal substrate may be used to form the thin film type optical device of the present invention by an entirely similar making method. The thin film type optical device of the present invention can be used not only in the aforementioned light deflecting device but also in various optically functioning elements such as a light modulator, etc.

According to the present invention, as described above, in the thin film type optical device wherein the light waveguide path layer is formed by proton exchange, the absorption peak of the infrared absorption spectrum of OH radical by the protons of the light waveguide path layer is in the range of wave number $3480 \text{ cm}^{-1}$ to $3503 \text{ cm}^{-1}$, and this leads to the effect that an optically functioning element having a high threshold value of optical damage can be obtained without reducing the deflection efficiency when it is used in a light deflecting device or the like.

I claim:

1. A thin film type optical device comprising:
   a substrate formed of lithium niobate crystal or lithium tantalate crystal; and
   a light waveguide path layer comprising protons introduced into the surface of said substrate in exchange for the lithium atoms in said crystal and having a refractive index higher than that of said substrate, the absorption peak of the infrared absorption spectrum of OH radical by the protons in said light waveguide path layer existing in the range of wave number $3480 \text{ cm}^{-1}$ to $3503 \text{ cm}^{-1}$.

2. A thin film type optical device according to claim 1, wherein said protons are heat-diffused on the surface of said substrate.

3. A thin film type optical device according to claim 1, wherein a metal is heat-diffused on the surface of said substrate.

4. A thin film type optical device according to claim 1, wherein lithium oxide is externally diffused on the surface of said substrate.

5. A thin film type optical device according to claim 1, further comprising a comb type electrode formed on said light waveguide path layer and exciting an elastic surface wave.

6. A thin film type optical device according to claim 1, further comprising a comb type electrode formed on said light waveguide path layer and producing a phase grating by the electro-optical effect.

* * * * *